March 26, 1946.   J. J. HOWARD   2,397,418
MEANS FOR REFINING METALS
Filed Sept. 25, 1944
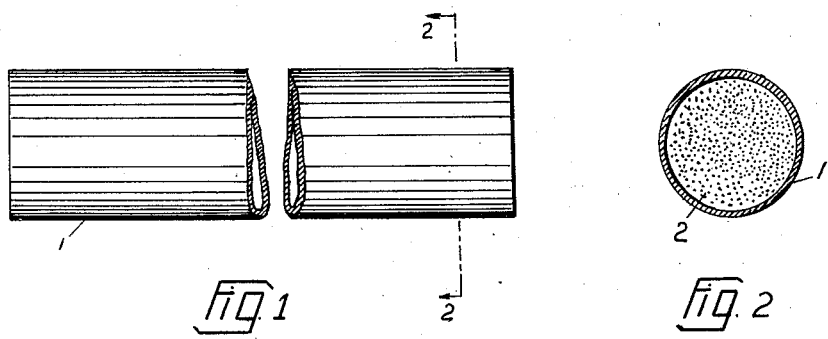
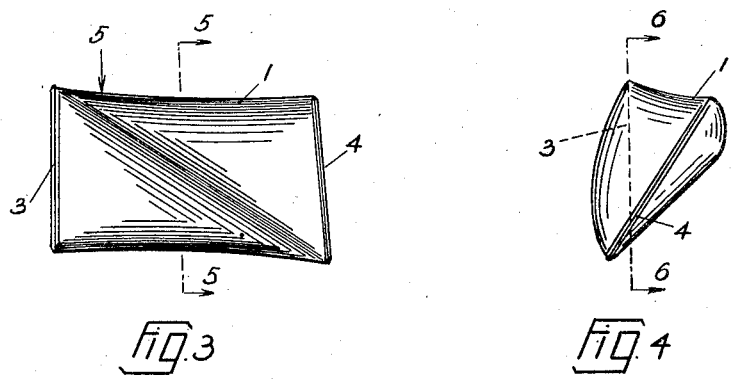
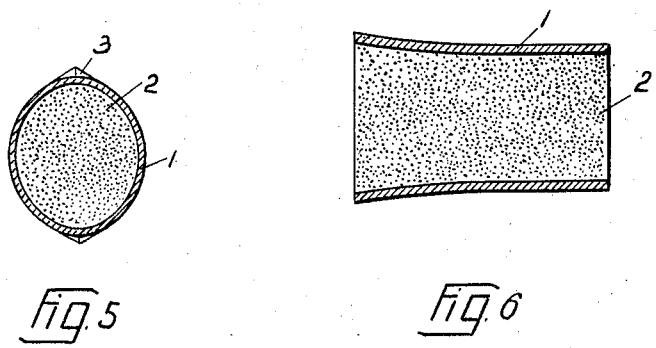
INVENTOR.
JOHN J. HOWARD
BY
ATTORNEY Patented Mar. 26, 1946

2,397,418

UNITED STATES PATENT OFFICE 2,397,418

MEANS FOR REFINING METALS

John J. Howard, Philadelphia, Pa.

Application September 25, 1944, Serial No. 555,651

2 Claims. (Cl. 75—56)

The purification of molten steel and the part or entire removal of certain components, such as carbon, silicon, phosphorus, sulphur, by oxidation and slagging is carried out by the addition of high-grade oxidic ores, for instance, iron and manganese ores, to the steel bath during the oxidizing stage; this method is particularly applicable to open hearth furnaces.

For obvious reasons large sized and lumpy ores are preferred for this purpose; due to their weight and their compactness the coarse and lumpy ore bodies penetrate through the floating slag layer into the molten metal and contact the same completely, thereby enabling the oxygen of these added correctives to efficiently exert their refining action.

However, the increasing scarcity of high-grade, large-sized coarse iron and manganese ores has focused the attention of the interested parties upon the application of small-sized and fine ores, particularly in view of the fact that very high-grade fine ores exist in great quantities, are easily accessible and are not premium priced ores.

The conversion of small-sized iron, manganese and similar ores into coarse pieces and bodies to be successfully employed for the oxidizing purification of molten iron and steel baths has, therefore been placed in the foreground of expert activities which, however, hitherto have not resulted in a satisfactory solution of the problem.

The grave drawbacks and difficulties encountered in the introduction of fine ores into a slag covering the iron- and steel-melt are obvious.

The small ore particles do not possess sufficient impetus to penetrate the rather tenacious floating slag layer; even if the specific gravity of the ore is greater than that of the slag surface. Forces arise when fine ore particles are charged onto the slag, which keep the ore in suspension within the slag layer. The ore, therefore, cannot contact and cannot react with the molten steel so its usefulness as an oxidizing agent is practically lost.

The finest and purest fraction of the added finely sized ore particles may not even reach the bath as they are carried from the furnace with the flue gases.

It, therefore, is an object of the invention to convert finely sized iron, manganese and other ores adapted to be used for the oxidizing treatment of iron and steel baths into bodies which easily penetrate the slag layer, thereby being adapted to react with the undesirable components of the molten metal.

It is another object of the invention to accomplish the contact of the added ore with the metal after the ore has passed into deeper strata of the molten charge.

It is another important object of the invention to effect the reaction of the finely sized ore with the steel after the ore has been heated to the reaction temperature and eventually converted into the molten state, thus affording the most desirable conditions for a quick and efficient oxidizing reaction.

It is another object of the invention to manufacture bodies of the above named type which do not contaminate the metal bath or introduce undesirable elements into the same.

It is another object of the invention to prevent premature losses of the fraction of fines of the added ores.

It is also an object of the invention to create by the reaction in the deeper strata of the molten metal, movements and circulations in the bath which will contribute to its uniformity.

It is also an object of the invention to effect the conversion of the fine ores into larger bodies by the application of exceedingly simple, inexpensive and efficient means.

It is another object of the invention to combine with the manufacture of the bodies forming the subject matter of this invention a control of their refining capacity.

It is a further object of the invention to render these bodies in a state where losses of the ore and contaminations of the same during handling and transport are eliminated.

It is another object of the invention to adapt the manufacture of the fine ore bodies to the specific requirements and particularly to the temperature conditions of the steel bath.

It is also an object of the invention to adapt the size of the fine ore bodies to the size and nature of the charging equipment.

Moreover, the fine ore containing bodies made in accordance with the invention might be used to introduce desired components into the steel.

With these and other objects in view which will become apparent as this specification proceeds, the invention comprises broadly the encasement of the small-sized ores to be used for the oxidation of iron and steel baths in sealed tube sections.

It is also an object of the invention to improve and to accelerate the penetration of the fine ore bodies into the bath by the peculiar shape imparted to the same during their manufacture.

The problem of converting and compacting fine metallurgical products and by-products, such as fine ore, fine dust, finely divided metals and the like into solid bodies or briquettes is largely known, and many methods and means have been designed to solve this problem.

It is also not new to encase ores and mixtures of ores with purifying correctives and agents in cylindrical steel containers which form themselves the initial charge.

It has been suggested to fill iron ore to be processed in an open hearth furnace into an iron receptacle, to compress the ore in these receptacles and to charge the same into the furnace.

However, with all these known methods the receptacles containing the fine ore form the initial charge; moreover, the canisters or receptacles were made first, the ore was charged afterwards into the same and then they were closed. The canisters were made of thin iron sheets which would not serve the purpose of a quick penetration through a floating slag layer.

Moreover, the costs of making proper containers or canisters for the fine ore would increase the costs of the refining steel treatment in open hearth furnaces at a commercially unbearable rate, whereas the very low manufacturing costs of the fine ore containing bodies made according to the invention constitute one of its main advantages.

The manner and the means for executing this invention which will now be described in detail are illustrated in the accompanying drawing of which Fig. 1 shows a tube filled with fine ore from which the individual sections for the encasement of the fine ore are severed, Fig. 2 shows a vertical sectional view of the tube on the line 2—2 of Fig. 1, Fig. 3 shows a perspective front view of the finished ore containing body made of a tube section and ready for introduction into the steel bath, Fig. 4 shows a perspective end view of the same body viewed at an angle of 90° in relation to Fig. 3, Fig. 5 is a vertical sectional elevation on line 5—5 of Fig. 3, Fig. 6 is a vertical sectional elevation on line 6—6 of Fig. 3.

The initial material for carrying this invention into effect is an ordinary steel tube or pipe; the tube may be new, although used and discarded steel tubes, for instance old boiler tubes, may be quite effectively employed; tubes which would introduce undesirable components into the molten steel under treatment are naturally exempted from use. Indeed, the composition of the tubes from which the casings for the fine ore are made should at least to a certain degree harmonize with the composition of the steel to be refined and the tube sections may also be used to introduce certain desired components into the steel.

The tubes are filled with the finely sized ore which is to effect the oxidizing and refining action.

The filled tube is divided into sections of a desired length by cutters or shears which simultaneously exert a compressing, flattening, severing and sealing action upon the ends of these tube sections; any shears or cutters having movable jaws, for instance alligator shears, may be used, as long as the shears first compress the tube and flatten it, then sever the flattened portion and at the same time automatically seal the severed end of the thus formed section; the term "shearing compression" is used in the specification to define this action of the shears; as the two flattened ends of the ore containing tube sections are tightly sealed, the ore is prevented from falling out, as previously mentioned, shears having two movable jaws are particularly well suited for the manufacture of the filled tube sections, but any other shears having a fixed and a movable jaw may also be used.

The filled and sealed bodies are directly charged into the steel bath by customary charging means; they penetrate quickly through the floating slag layer and descend into the deeper portions of the bath. Here the casing forming tube section becomes molten and the thereby released oxidizing agents are free to react with the impurities of the steel under highly favorable conditions, where their refining action is utilized to the fullest extent. When during the oxidizing stage the ore reacts with the undesirable components of the steel, it is itself in the molten stage or in a condition which is best suited for intense reaction.

The length of the tube sections and therewith the quantity of the encased ore is optional with the user. The larger the diameter of the pipe is, the thicker should its wall thickness be to stand the shearing pressure.

However, the wall thickness of the tube should not be too large as this would introduce an amount of cold metal into the bath which might not melt quick enough and even influence the temperature conditions of the bath. With hard ore, such as magnetite, a heavier wall gage, and with softer ore a thinner wall thickness is desirable.

It has been found by practical experience that the tube should not have a smaller than a three inch inside diameter, particularly also for economical reasons, and that the inside diameter should not exceed 6 inches, as this would render the handling of the tube rather difficult.

As the length of the tube sections determines the quantity of sealed-in ore, the length may depend upon the particular conditions of the furnace operation and the amount of impurities to be removed within a certain time. For practical reasons the tube sections should have a length to conform with the size of the charging equipment and should, therefore, not exceed a length of about 10 inches.

The specific manner of carrying out the invention will now be specifically described with reference to the drawing.

Fig. 1 and Fig. 2 show an ordinary steel tube 1 which has been filled with fine iron ore 2. As a matter of precaution the ends of the tube may be closed with a stopper or by any other customary means to prevent the ore from falling out at the ends of the tube.

The sections are severed from the filled tube by suitable shears, as described previously. If the tube is passed through stationary shears the length of the tube sections and thereby the quantity of the oxidizing agents of each section may be controlled by the adjustment of the advance speed of the tube.

By the compressing action of the shear jaws the filled tube 1 is first compressed and flattened, as shown in Figs. 3 and 4; the tube is then severed and at the same time automatically sealed; the two compressed sealed ends are denominated with numerals 3 and 4. The ore containing sections 5 are now ready to be immersed in the steel bath by customary charging devices.

In the embodiment of the invention which is illustrated in the drawing, the tube has been rotated at an angle of about 45° between the successive cutting operations; in consequence thereof the directions of the sealed ends which are indicated by arrows are accordingly displaced in relation to each other at the same angle; if the tube is not rotated, the directions of the sealed ends will run parallel without forming an angle relative to each other.

The reasons for turning the tube to change the direction of the cuts or seals are manifold.

First, the outer shape given thereby to the ore bearing bodies 5 facilitates the handling and the transport.

If the tube is not rotated, each consecutive cut which severs the section from the tube might cause a collapse of the section over its entire length and accordingly reduce the storage space for the ore; by turning the tube before the severing is performed a better resistance is created to the flattening action of the shears.

The peculiar shape given to the bodies 5 by severing the same from the tube at varying angles imparts to them upon immersion into the bath a twisting movement by the counteraction of slag and metal through which the body penetrates.

The twist imparted to the ore containing bodies 5 facilitates and accelerates their passage into the bottom portion of the bath.

The invention is in the foregoing specification described in its application to the refining of molten steel in open hearth furnaces and the substances to be filled into the tube sections are generally determined as fine iron and manganese ores; however, it is understood that the invention is well applicable to other furnaces, where other metals than steel are subjected to oxidizing and refining operations with finely sized correctives; stainless steel may be refined in the same manner using either fine chrome ore or iron ore; the purification of copper baths, for instance, may be accomplished with copper tube sections filled with finely divided agents; indeed, the invention is well usable in all cases where slag covered molten metals are treated with fine pulverulent agents which must penetrate a floating slag layer before descent into deeper sections of the bath before the refining action is commenced.

I claim:

1. A method of encasing finely sized ore for use in the refining of molten steel, comprising filling the ore into a pipe, flattening and severing the filled pipe at predetermined lengths into sections, sealing said sections at their open ends by shearing compression, and turning the pipe at a certain angle prior to each severing procedure for thereby encasing the ore in sealed pipe sections having their sealed ends extending at the turning angles in relation to each other and forming closed ore containing steel bodies of an optimum storing capacity.

2. Hollow metal bodies for the refining of molten steel containing finely sized oxidic ores and consisting of metal pipe sections having deformed and sealed end portions, the seal extending at an angle relative to each other.

JOHN J. HOWARD.